US011155242B2

(12) United States Patent
Barret et al.

(10) Patent No.: US 11,155,242 B2
(45) Date of Patent: Oct. 26, 2021

(54) END PIECE FOR A WIPER BLADE

(71) Applicant: Valeo Systemes D'Essuyage, La Verriere (FR)

(72) Inventors: Guillaume Barret, Issoire (FR); Xavier Bousset, Issoire (FR); Denis Thebault, Issoire (FR)

(73) Assignee: Valeo Systemes d'Essuyage, La Verriere (FR)

( * ) Notice: Subject to any disclaimer, the term of this patent is extended or adjusted under 35 U.S.C. 154(b) by 58 days.

(21) Appl. No.: 16/607,771

(22) PCT Filed: Apr. 19, 2018

(86) PCT No.: PCT/EP2018/060093
§ 371 (c)(1),
(2) Date: Oct. 24, 2019

(87) PCT Pub. No.: WO2018/197340
PCT Pub. Date: Nov. 1, 2018

(65) Prior Publication Data
US 2020/0047716 A1 Feb. 13, 2020

(30) Foreign Application Priority Data
Apr. 28, 2017 (FR) ..................................... 1753790

(51) Int. Cl.
*B60S 1/38* (2006.01)
*B60S 1/52* (2006.01)

(52) U.S. Cl.
CPC ............. *B60S 1/3887* (2013.01); *B60S 1/38* (2013.01); *B60S 1/52* (2013.01); *B60S 2001/3822* (2013.01)

(58) Field of Classification Search
CPC ............. B60S 1/52; B60S 1/38; B60S 1/3891
See application file for complete search history.

(56) References Cited

U.S. PATENT DOCUMENTS 9,598,052 B2 * 3/2017 Espinasse ............... B60S 1/524
10,077,029 B2 * 9/2018 Bousset .................. B60S 1/524
(Continued)

FOREIGN PATENT DOCUMENTS

| EP | 3081440 A1 | 10/2016 |
| EP | 3135547 A1 | 3/2017 |
| WO | 2009/053229 A1 | 4/2009 |

OTHER PUBLICATIONS

Int'l Search Report for PCT/EP2018/060093, dated Jun. 29, 2018.

*Primary Examiner* — Michael D Jennings
(74) *Attorney, Agent, or Firm* — Valeo Systemes d'Essuyage

(57) ABSTRACT

The invention relates to an end piece for a wiper blade, extending longitudinally between a bottom wall and an inlet for inserting a structural element of the wiper blade into the end piece, said end piece comprising at least one first receiving element designed to receive a wiper blade, a second receiving element designed to receive the structural element, and a third receiving element into which a means for attaching the end piece to the structural element extends, the first receiving element and the second receiving element being arranged one above the other in a longitudinal plane (P) of the end piece, characterised in that the attaching means comprises a lug which is flexible around a vertical axis (Z') parallel to the longitudinal plane (P), the flexible lug having an "L" shape, at least one limb of which extends towards an edge defining the third receiving element.

10 Claims, 2 Drawing Sheets

(56) References Cited

U.S. PATENT DOCUMENTS

| | | | |
|---|---|---|---|
| 2006/0107485 A1* | 5/2006 | Kim | B60S 1/3891 |
| | | | 15/250.201 |
| 2016/0304062 A1 | 10/2016 | Carrion et al. | |
| 2016/0375868 A1* | 12/2016 | Jomard | B60S 1/3891 |
| | | | 15/250.361 |
| 2017/0057465 A1 | 3/2017 | Houssat et al. | |

* cited by examiner

END PIECE FOR A WIPER BLADE

The field of the present invention is that of wiper systems intended to equip a motor vehicle. It consists in an end piece intended to be disposed at one end of a wiper blade of a wiper system of this kind.

A motor vehicle is routinely equipped with a wiper system intended to wipe away liquids and dirt that may interfere with the view of their environment of a driver of the motor vehicle.

These windscreen wipers generally include a driving arm that effects an angular to-and-fro movement about a rotation axis and an elongate wiper blade equipped with a wiper rubber made from an elastic material. By rubbing against a front or rear glazed surface of the motor vehicle the wiper rubber wipes away water thereon and some dirt thereon and evacuates them out of the field of view of the driver.

Regardless of the configuration of the wiper blade, that is to say whether it is a wiper blade including articulated brackets that retain the wiper rubber in a plurality of distinct zones or a wiper blade including at least one structural element that retains the wiper rubber over its entire length, otherwise known as a "flat blade", the wiper blade is attached to an end part of the driving arm by means of a connecting device that includes a connector mounted on and fastened to the wiper blade.

At each of the longitudinal ends of a "flat blade" variant wiper blade the wiper rubber and the structural element are equipped with an end piece that participates in maintaining the wiper rubber and the structural element fastened to one another.

These end pieces conventionally include a space configured to receive a portion of the wiper rubber, another space configured to receive the structural element and a member for retaining the end piece in position on the structural element.

It is clear that to fulfil its primary function this member for holding the end piece in position on the structural element extends at least partly into the other space, that is to say the one configured to receive the structural element. The retaining member is then disposed substantially at the center of the end piece, this retaining member thus being also far from one or the other of the external faces of said end piece.

A disadvantage of this solution lies in the fact that this retaining member is positioned inside the end piece, which makes accessing it difficult for a user wishing to disengage it in order for example to replace the wiper rubber rather than the entire wiper blade. Consequently, if the latter has to remove the end piece, they have to use a tool in order to be able to disengage said end piece.

In addition to their mechanical function, the end pieces may have an esthetic function, to conceal the ends of the wiper blades. In order to fulfil this function the end piece retaining member may be concealed within the end piece, preferably with access via a lower part of this end piece, that is to say a part of this end piece facing toward the glazed surface to be white.

Once again, this solution has the disadvantage of making access to the retaining member difficult for the user.

One object of the present invention is therefore to propose an end piece for a wiper blade including a member for retaining the end piece to which access is difficult but which can nevertheless be actuated easily if required, in particular to be disengaged without using tools.

One object of the present invention therefore concerns an end piece for a wiper blade, extending longitudinally between a bottom wall and an inlet for inserting a structural element of the wiper blade into the end piece, said end piece including at least one first housing configured to receive a wiper rubber, a second housing configured to receive the structural element, and a third housing into which a means for attaching the end piece to the structural element extends, the first housing and the second housing being arranged one above the other in a longitudinal plane of the end piece.

According to the present invention, the end piece is recognizable in that the attaching means includes a lug which is flexible around a vertical axis parallel or substantially parallel to the longitudinal plane, this flexible lug having an "L" shape, at least one branch of which extends toward an edge delimiting the third housing.

The end piece according to the present invention extends mainly along a longitudinal axis. The longitudinal plane is a plane that extends along the greatest dimension of the end piece. The longitudinal axis of the end piece is therefore inscribed in this longitudinal plane, the latter being a plane that intersects the first housing and the second housing.

When the second housing extends in a horizontal plane, the longitudinal plane may be a vertical longitudinal plane, that is to say one perpendicular to the horizontal plane of the second housing.

According to the invention, one of the branches of the flexible lug extends in a longitudinal direction parallel to the longitudinal axis of the end piece and the other branch extends perpendicularly or substantially perpendicularly to that longitudinal direction toward an edge partly delimiting the third housing. To be more precise, this other branch extends toward an edge delimiting an opening of the third housing. That opening in particular makes it possible to render the attachment means easily accessible for the user.

For example, a larger branch of the flexible lug may extend in the longitudinal direction and a smaller branch of that flexible lug may extend toward the edge delimiting the opening of the third housing. According to another example, a smaller branch of the flexible lug may extend in the longitudinal direction and a larger branch of that flexible lug may extend toward the edge delimiting the opening of the third housing.

According to one feature of the present invention, a free end of the branch of the flexible lug that extends toward the edge is flush with a plane in which is inscribed the opening of the third housing delimited by the edge.

According to one feature of the present invention, the flexible lug includes a holding zone configured to enable release of the end piece from the structural element, this holding zone being formed by a free end of one of the branches of the flexible lug.

This holding zone is formed by the free end of the branch extending toward the edge delimiting the opening of the third segment.

It is therefore clear that the combination of the shape of the flexible blade with its orientation toward the opening of the third housing enables the user to disengage the end piece from the wiper blade into which it is intended to be integrated without having to use any tool.

According to one aspect of the present invention, the first housing and the second housing of the end piece have a common intermediate wall, that intermediate wall emerging from the back wall of the end piece and extending mainly in a longitudinal extension plane, that is to say a plane in which the longitudinal axis of the end piece is inscribed.

According to one feature of the present invention, the second housing is produced in a central position of the end piece. This second housing is therefore disposed at substantially equal distances from a lower wall of the end piece and from an upper wall of that end piece, that lower wall and that upper wall emerging from the back wall of the end piece and extending parallel to the intermediate wall that separates the first housing from the second housing. The lower wall participates in delimiting the first housing and the upper wall participates in delimiting the second housing.

The opening of the third housing may for example be in one of the walls that delimit the first housing. This opening is advantageously in the lower wall of the end piece.

According to the present invention, one branch of the flexible lug extends at least partly into the second housing. For example, one branch of the flexible lug extends a flank that partly delimits the second housing and another branch of the flexible lug extends into the third housing along the first housing, this latter branch being that which extends toward the edge delimiting the opening of the third housing. It is then clear that this other branch of the flexible lug extends along the first housing in a direction parallel to the vertical axis about which this lug is flexible.

According to one embodiment of the present invention, a larger branch of the flexible lug extends the flank partly delimiting the second housing and a smaller branch of the flexible lug is oriented toward the edge delimiting the third housing.

According to another embodiment of the present invention, the smaller branch of the flexible lug extends along the flank partly delimiting the second housing and the larger branch of the flexible lug is oriented toward the edge delimiting the third housing.

According to one embodiment of the present invention, the attachment means that extends into the third housing is a first attachment means and the end piece includes a fourth housing into which extends a second means for attaching the end piece to the structural element, this second attachment means including a flexible tongue flexible about an axis parallel to the longitudinal vertical plane in which the first housing and the second housing are inscribed, this flexible tongue having an "L" shape at least one branch of which extends toward an edge delimiting the fourth housing, the third housing and the fourth housing being on respective opposite sides of the first housing and the second housing.

According to this embodiment, the end piece may be interchangeably positioned at each of the longitudinal ends of the structural element that it is intended to cover. The user then has no need to match a particular end piece with a given longitudinal end of the structural element.

According to this embodiment, two openings are formed in the lower wall of the end piece, a first opening being associated with the third housing and a second opening being associated with the fourth housing. A free end of one of the branches of the flexible lug is flush with a first plane in which is inscribed the edge delimiting the first opening and a free end of one of the branches of the flexible tongue is flush with a second plane in which is inscribed an edge delimiting the second opening. This first plane and this second plane may coincide or be distinct, the first opening and the second opening both being formed in the same wall.

According to one feature of the second invention, a body of the end piece and at least one attachment means are in one piece, that is to say produced together from the same material.

This end piece may for example be made from a synthetic material.

By "body of the end piece" is meant all parts of the end piece not participating in the attachment means, excluding the housing. In other words, the first housing, the second housing, the third housing and the attachment means are formed in the body of the end piece.

Clearly in the embodiment in which the end piece includes a second attachment means, the two attachment means are in one piece with the body of the end piece.

According to one feature of the present invention, the body of the end piece may be configured to receive an air deflector of a wiper blade.

The present invention also concerns a wiper blade including a wiper rubber, at least one structural element and at least one end piece according to the present invention, this wiper rubber and this structural element extending mainly along a longitudinal axis and the structural element including at least one notch at one longitudinal end at least of that structural element, the notch cooperating with the attachment means of the end piece.

In accordance with one aspect of the present invention, the wiper blade may include two end pieces at respective longitudinal ends of the wiper blade.

The expression "longitudinal end of the wiper blade" covers both a longitudinal end of the wiper rubber and a longitudinal end of the structural element.

The present invention further includes a wiper system for motor vehicles including at least one wiper blade according to the present invention, this wiper blade being connected to a driving arm by a connection device.

Other details, features and advantages will emerge more clearly on reading the detailed description given hereinafter by way of example and with reference to the various embodiments shown in the following figures.

Figure 1:
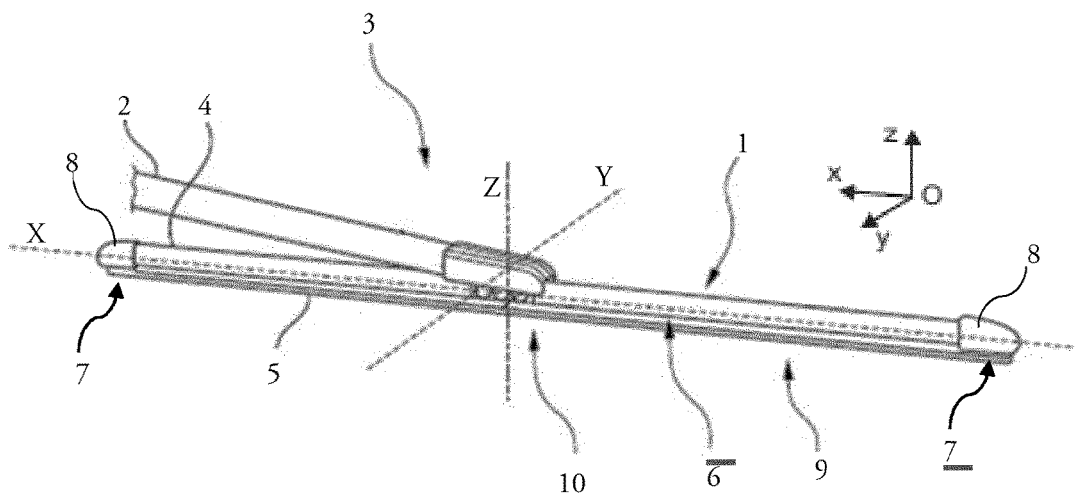
FIG. 1 is a diagrammatic representation of a wiper system including at least one end piece according to the present invention.

In the figures, the terms longitudinal, transverse, vertical, lateral, left-hand, right-hand, upper, lower refer to the orientation in an orthonormal system of axes Oxyz of a wiper blade 1 shown in FIG. 1. In that system of axes, the axis Ox represents the longitudinal direction, the axis Oy represents the transverse direction, and the axis Oz represents the vertical direction of the object concerned, in particular the end piece or the wiper blade. In this system of axes a vertical longitudinal plane is parallel to the plane Oxz, a vertical transverse plane is parallel to the plane Oyz and a horizontal longitudinal plane is parallel to a plane Oxy.

In FIG. 1 a wiper blade 1 according to the present invention extends along a longitudinal axis X parallel to the axis Ox. The terms left and right relate to a position along a transverse axis Y parallel to the axis Oy on either side of the longitudinal axis X. A vertical axis Z symbolizes a vertical direction parallel to that of the axis Oz that is perpendicular to the longitudinal and transverse directions described hereinabove. The terms upper and lower refer to orientations along the vertical axis Z, the term lower containing the plane of the windshield. For the longitudinal directions, the terms exterior and interior refer to a point at which the wiper blade pivots on a driving arm 2 of the wiper blade 1, the term interior corresponding to a part in which the driving arm 2 and one half-blade extend, the term exterior corresponding to a part in which the other half-blade extends.

A motor vehicle is routinely equipped with a wiper system 3 for evacuating water and/or dirt present on a glazed surface, in particular a rear window or a windshield at the front of a motor vehicle. The wiper system 3 includes the driving arm 2 that is able to effect an angular to-and-fro movement along and over the glazed surface.

The wiper system 3 also includes the wiper blade 1 that extends along the longitudinal axis X. The wiper blade 1 includes a wiper rubber 5 that also extends along that longitudinal axis X and at least one air deflector 4. The air deflector 4 is adapted to transform a pressure applied by a flow of air along the glazed surface into a force pressing the wiper blade 1 against the glazed surface of the motor vehicle.

The wiper rubber 5 is the part of the wiper blade 1 in direct contact with the glazed surface to evacuate water and/or dirt present on the latter. The wiper rubber 5 is for example a flexible rubber made of an elastic material such as in particular a polymer or a rubber.

The wiper blade 1 also includes a structural element 6 that imparts to the wiper blade 1 a certain deformation in the plane Oxz so as to distribute the bearing force of the driving arm 2 along the wiper blade 1 and thus to track a curvature of the glazed surface.

The structural element 6 may be a metal strip, otherwise termed a spine, that extends along the longitudinal axis X. There may be one spine of this kind but the structural element 6 may equally include two of these spines, which are then disposed one beside the other in the plane Oxy.

Figure 2:
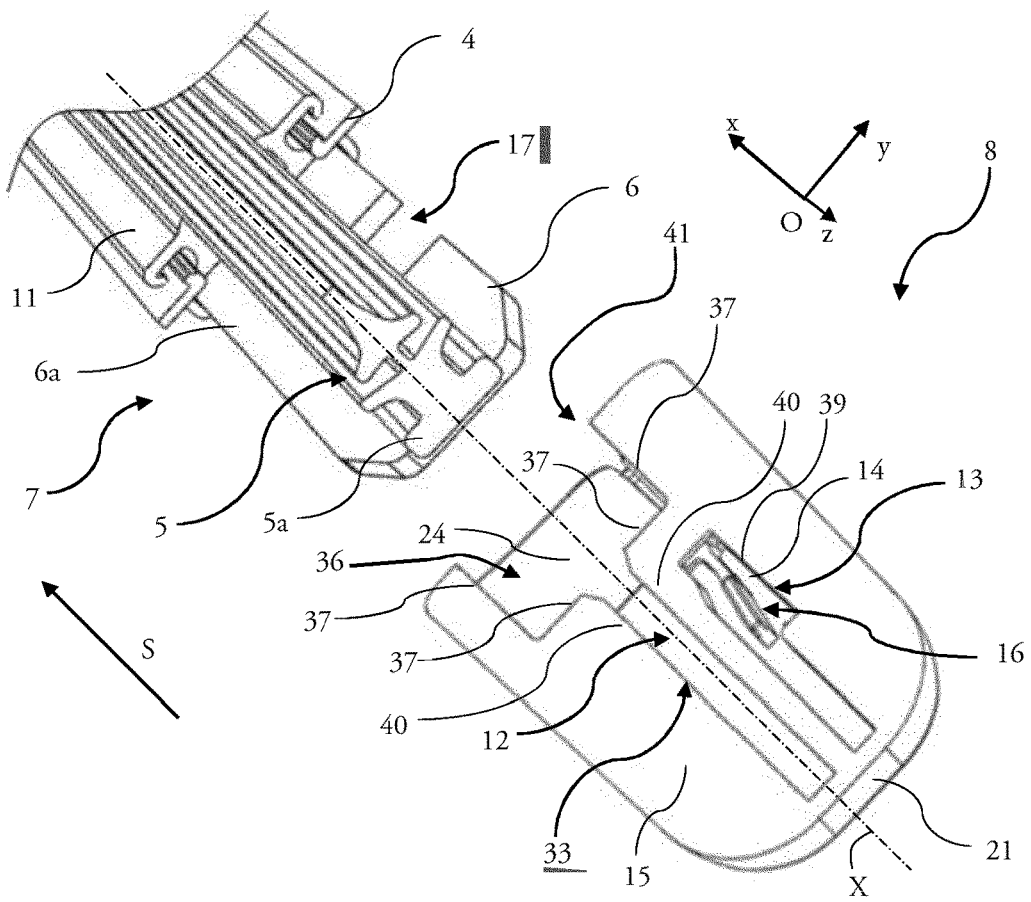
FIG. 2 is a perspective view from below of the end piece of the wiper blade and of a structural element intended to be received in that end piece.

As shown in FIG. 2, the structural element 6 may equally be the combination of a support 11 in which a longitudinal channel is formed with a single metal strip 6a threaded into the channel. In a situation of this kind the support 11 may include two hooks that retain the wiper rubber 5 by its heel 5a, the support 11 then providing a mechanical connection between the wiper blade 5 and the metal strip 6a.

Referring to FIGS. 1 and 2, the wiper blade 1 also includes at each of its longitudinal ends 7 an end piece 8. Each end piece 8 is adapted to hold together the wiper rubber 5 and the structural element 6, an end piece 8 of this kind being adapted for example to cover an end part of the air deflector 4. The structural element 6 therefore extends from a first longitudinal end 7 of the wiper blade 1 to a second longitudinal end 7 of the same wiper blade 1.

The air deflector 4, the wiper blade 5 and the structural element 6 form a semi-rigid structure 9 that is carried by a connection device 10 disposed between an end part of the driving arm 2 and the semi-rigid structure 9. A connection device 10 of this kind includes for example a connector fastened at least in an isostatic manner to the semi-rigid structure 9 and an adapter connected by a pivot connection to the connector.

FIG. 2 shows one of the longitudinal ends 7 of the wiper blade 1 intended to be integrated into the wiper system 3 and an end piece 8 intended to be assembled onto this longitudinal end 7 of the wiper blade 1.

As described above, the wiper blade includes the wiper rubber 5, the structural element 6 and the air deflector 4, this wiper rubber 5, this structural element 6 and the air deflector 4 being, in an example shown in this figure, held together by the support 11. As shown in this FIG. 2, the longitudinal ends of the structural element 6 and of the wiper rubber 5 extend longitudinally out of the support 11. Before mounting the end piece 8 the longitudinal ends 7 of these elements are therefore free.

As described above, the end pieces 8 are configured to retain at least the wiper rubber 5 on the structural element 6 at the level of these longitudinal ends 7. In other words, these end pieces 8 act as the support 11 at the level of the longitudinal ends 7 of the wiper blade.

The end piece 8 extends mainly along the longitudinal axis X between a back wall 21 and an entry mouth 41 via which the structural element 6 of the wiper blade enters into the end piece 8 to be housed in a housing dedicated to this purpose, this housing being referred to hereinafter as the second housing 19.

The end piece 8 includes at least one first housing 12 configured to receive the wiper rubber 5 of the wiper blade 1 and at least one second housing, not visible in FIG. 2, configured to receive the structural element 6, and in particular an end part of the spine. Facing the first housing 12, a lower wall 15 of the end piece 8 includes a slot 33 via which the wiper rubber 5 is introduced into this first housing 12. This slot 33 is flanked by two hooks 40 configured to retain the wiper rubber 5 in the first housing 12. These two hooks 40 are more particularly configured to grip a heel 5a of this wiper rubber 5.

As shown, the end piece 8 is slid over the longitudinal end 7 of the wiper blade 1 in a direction S parallel to the longitudinal axis X of the end piece 8.

As can be seen in FIG. 2, the end piece 8 further includes a third housing 13 that is flanked by an opening 14 in the lower wall 15 of the end piece 8 and delimited by an edge 39. This opening 14 exposes an attachment means 16 for attaching the end piece 8 to the structural element 6.

Figure 3:
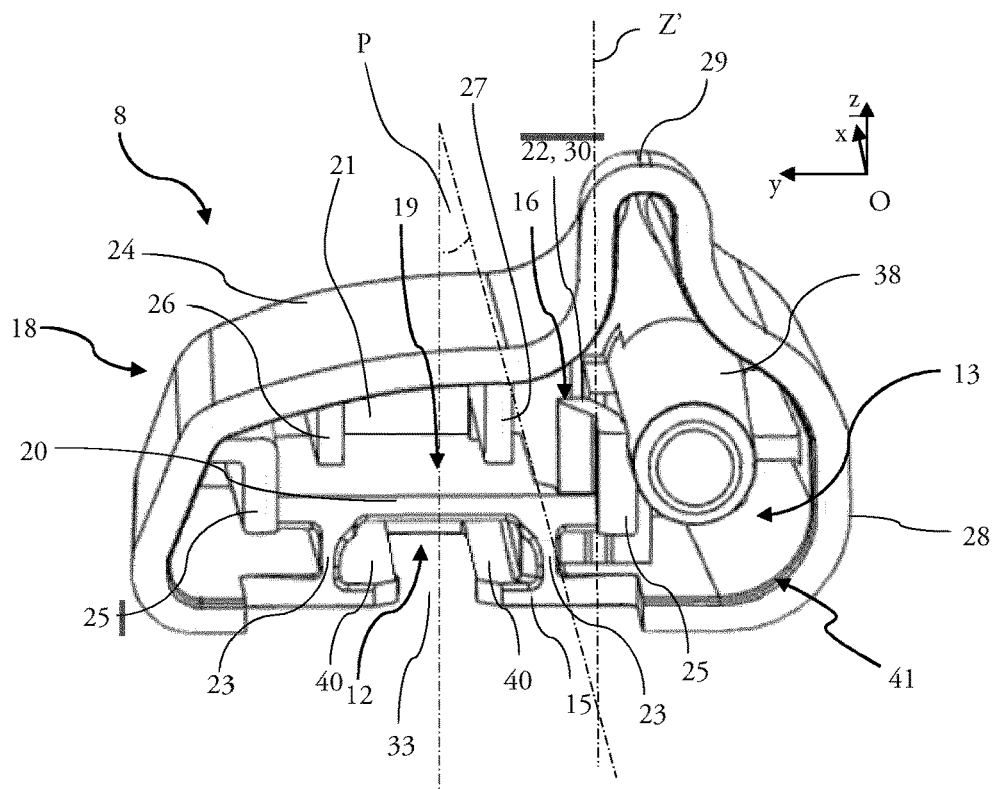
FIG. 3 is a perspective view of the end piece according to the present invention.
Figure 4:
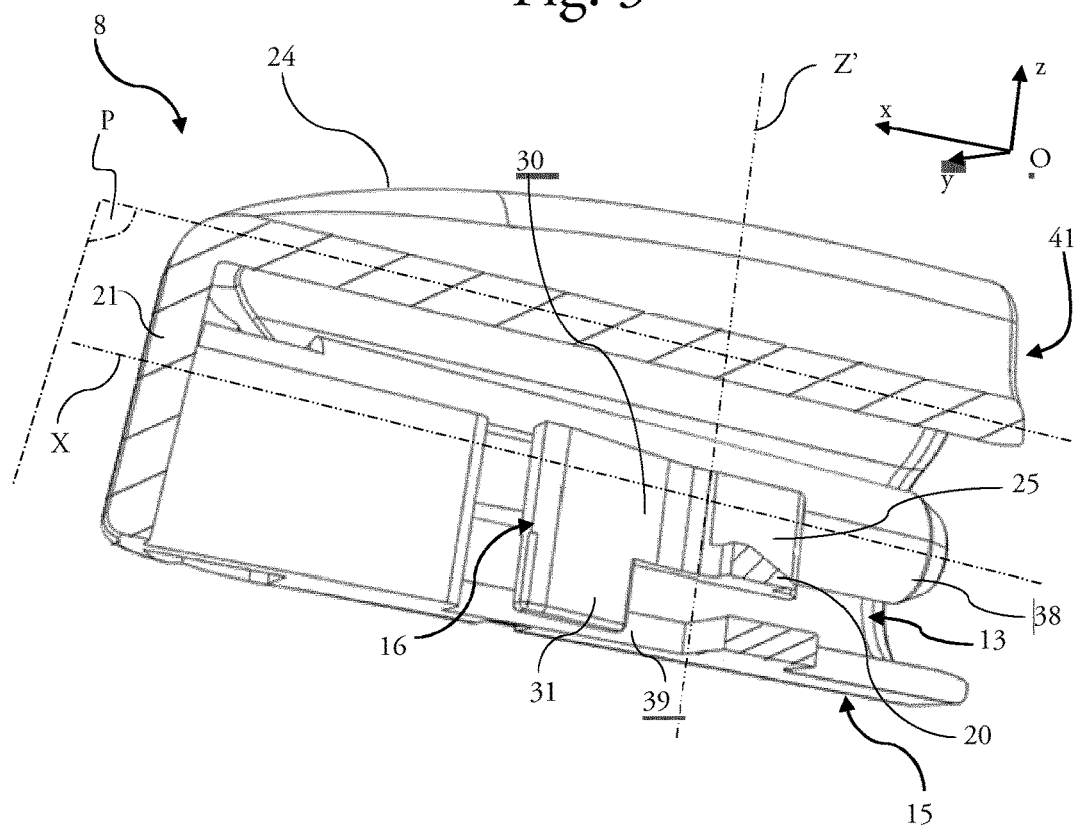
FIG. 4 is a perspective view of the end piece according to the present invention in section on a longitudinal, here vertical, plane.

This attachment means 16, described more fully in the remainder of the description, in particular with reference to FIGS. 3 and 4, is configured to be housed in a notch 17 formed in the structural element 6. As shown, this notch 17 is produced starting from one longitudinal edge of the structural element 6.

The end piece 8 also includes a void 36 that opens through the lower wall 15 and extends as far as a longitudinal end of the end piece 8. An outlet of this void 36 is therefore delimited by four edges 37. These edges 37 serve as abutments for the wiper blade 1 and more particularly for the support 11 of this wiper blade 1.

This void 36 therefore exposes an upper wall 24 of the end piece 8.

The end piece 8 will now be described in more detail with reference to FIGS. 3 and 4, FIG. 3 being a view of the end piece 8 as seen from the connection device of the wiper blade and FIG. 4 being a perspective sectional view of this end piece 8 on a longitudinal, in particular vertical, plane P parallel to the plane Oxz.

Generally speaking, the end piece 8 is formed of a body 18 in which are formed the first housing 12 configured to receive the wiper rubber, the second housing 19 configured to receive the structural element and the third housing 13 into which extends the attachment means 16 for attaching the end piece 8 to the structural element.

As can be seen in FIG. 3, the first housing 12 and the second housing 19 extend parallel to the longitudinal axis X and are disposed one vertically under the other. In other words, the first housing 12 and the second housing 19 are arranged directly one under the other, in the longitudinal plane P, the latter intersecting each of the housings. This first housing 12 and this second housing 19 therefore have a common intermediate wall 20. This intermediate wall 20 is in one piece with the back wall of the end piece 8 and lies in a longitudinally extending plane parallel to the plane Oxy of the orthonormal system of axes.

The first housing 12 is delimited by the intermediate wall 20, by the lower wall 15 of the end piece 8, by two lateral walls 23 connecting this intermediate wall 20 this lower wall 15, and optionally by the back wall 21 of the end piece 8. The lower wall 15 is in one piece with the back wall 21 of the end piece 8 and extends parallel to the intermediate wall 20. As described above, the slot 33 via which the wiper rubber 5 is introduced into the first housing 12 is in the lower wall 15 of the end piece 8. This slot 33 is delimited by the two hooks 40 configured to retain the wiper rubber 5 in the first housing 12.

The second housing 19 is for its part delimited by the intermediate wall 20, by the upper wall 24 of the end piece 8, by two flanks 25, by a plane in which are inscribed a free end of a first upright 26 in one piece with the upper wall 24 and a free end of a second upright 27 also in one piece with that upper wall 24, and optionally by the back wall 21. It is clear that these uprights 26, 27 are parallel to one another and enable immobilization of the structural element intended to be received in the second housing 19 in the vertical direction, that is to say along the axis Oz.

The third housing 13 is situated laterally of the first housing 12 and of the second housing 19, that is to say to the right—or to the left—of those housings 12, 19. This third housing 13 is delimited by the lower wall 15, by the upper wall 24, by one of the flanks 25 delimiting the second housing 19 and optionally by a lateral wall 28 of the end piece 8, that lateral wall 28 of the end piece connecting the upper wall 24 to the lower wall 15 of that end piece 8.

Note that the upper wall 24 has an edge surface 29 facing or substantially facing the third housing 13 and configured to receive an end part of the air deflector of the wiper blade.

According to one embodiment of the present invention not shown here, the upper wall of the end piece is regular and does not have this edge surface, the end piece then being intended to be integrated into a wiper blade including no air deflector.

As described above, the attachment means 16 for attaching the end piece to the structural element extends into the third housing 13. As can be seen, a sleeve 38 also extends into this third housing 13. This sleeve 38 is in one piece with the back wall 21 of the end piece 8 and extends parallel to the longitudinal direction Ox of the orthonormal system of axes. This sleeve 38 is configured to block a passage formed in the wiper blade in which there circulates a liquid for cleaning the glazed surface on which the wiper blade including the end piece 8 is disposed.

The attachment means 16 includes for its part a lug 22 flexible about a vertical axis Z', this flexible lug 22 having an "L" shape one branch of which extends longitudinally from one of the flanks 25 delimiting the second housing 19 and the other branch of which runs vertically along the first housing 12, for example vertically along one of the lateral walls 23 participating in the delimitation of this first housing 12.

One of the branches of this "L" shape extends in a longitudinal direction parallel to the longitudinal direction Ox of the orthonormal system of axes shown in FIGS. 3 and 4. The other branch of this "L" shape extends perpendicularly or substantially perpendicularly to this longitudinal direction, parallel to the vertical direction Oz of this orthonormal system of axes, toward an edge 39 of the third housing 13. To be more precise, this other branch extends toward the edge 39 delimiting the opening 14 of the third housing 13 in the lower wall 15 of the end piece 8.

As shown, the branch of the flexible lug 22 that emerges from the flank 25 extends at least in part into the second housing 19. It is therefore clear that when the structural element of the wiper blade is slid into the second housing the flexible lug 22 comes to interfere mechanically with the structural element and can therefore cooperate with the notch in that structural element.

According to an embodiment of the present invention shown in FIGS. 3 and 4, a larger branch 30 of the flexible lug 22 extends in the longitudinal direction and a smaller branch 31 of that flexible lug 22 extends toward the edge 39 of the opening of the third housing 13. As can be seen in FIG. 4 in particular, a free end 32 of the smaller branch 31 of the flexible lug 22 is flush with a plane in which this opening 14 is inscribed.

According to another embodiment not shown here, the smaller branch of the flexible lug extends in the longitudinal direction and the larger branch of this flexible lug extends toward the opening of the third housing, a free end of this larger branch then being flush with the plane in which this opening is inscribed.

According to the embodiment shown in FIGS. 3 and 4, the smaller branch 31 is a zone for manually holding the flexible lug 22. Thus once this flexible lug 22 has been engaged in the notch of the structural element the user can easily disengage this flexible lug 22 by causing it to pivot about the vertical axis Z' in order to disengage the end piece 8 from the wiper blade. To facilitate this disengagement, an arrow may be produced on the lower wall 15 of the end piece in order to indicate the direction in which the user has to push the flexible lug 22 in order to disengage it from the notch.

According to a variant embodiment of the present invention not shown here, the end piece may include a fourth housing opposite the third housing with respect to the first housing and the second housing. In other words, according to this variant embodiment the third housing and the fourth housing are respectively to the right and to the left of the first housing and the second housing. According to this variant embodiment, the attachment means described above is a first attachment means and a second attachment means extends into the fourth housing, this second attachment means including a flexible tongue flexible about an axis parallel to the vertical axis about which the flexible lug described above is mobile.

This variant embodiment has the advantage of being able to adapt the end piece to any longitudinal end of a wiper blade, without the user having to give any thought to causing the attachment means to coincide with the notch in the structural element.

Thus the present invention proposes an end piece 8 for a wiper blade 1 including means 16 for attaching that end piece 8 to a structural element 6 of the wiper blade 1, that attachment means enabling simple disengagement of the end piece 8 not necessitating any tools.

The invention should not however be limited to the means and configurations described and shown here, and it also encompasses any equivalent means or configurations and any technically operative combination of such means. In particular, the dimensions and the position of the attachment means may be modified without compromising the invention provided that they fulfil the functionalities described in the present document.

The invention claimed is:

1. An end piece for a wiper blade, extending longitudinally between a bottom wall and an inlet for inserting a structural element of a wiper blade into the end piece, said end piece including at least one first housing configured to receive a wiper rubber, a second housing adapted to receive the structural element, and a third housing into which a means for attaching the end piece to the structural element extends, the first housing and the second housing being arranged one above the other in a longitudinal plane of the end piece, characterized in that the attaching means includes a lug which is flexible around a vertical axis (Z') parallel to the longitudinal plane (P), the flexible lug having an "L" shape, at least one branch of which extends toward an edge delimiting the third housing; and wherein one branch of the flexible lug extends a flank that partly delimits the second housing and in which another branch of the flexible lug extends into the third housing along the first housing.

2. The end piece as claimed in claim 1, in which a free end of the branch of the flexible lug that extends toward the edge is flush with a plane in which is inscribed an opening of the third housing delimited by an edge.

3. The end piece as claimed in claim 1, in which the opening of the third housing is in a wall of the end piece that delimits the first housing.

4. The end piece as claimed in claim 1, in which one branch of the flexible lug extends at least partly into the second housing.

5. The end piece as claimed in claim 1, in which a larger branch of the flexible lug extends the flank partly delimiting the second housing and in which a smaller branch of the flexible lug is oriented toward the edge delimiting the third housing.

6. The end piece as claimed in claim 1, in which a body of the end piece and the attachment means are in one piece.

7. The end piece as claimed in claim 1, in which the body of the end piece is configured to receive an air deflector of a wiper blade.

8. A wiper blade, comprising:
a wiper rubber;
at least one structural element; and
at least one end piece, the at least end piece including at least one first housing configured to receive the wiper rubber, a second housing adapted to receive the at least one structural element, and a third housing into which a means for attaching the end piece to the at least one structural element extends, the first housing and the second housing being arranged one above the other in a longitudinal plane of the end piece, characterized in that the attaching means includes a lug which is flexible around a vertical axis (Z') parallel to the longitudinal plane (P), the flexible lug have an "L" shape, at least one branch of which extends toward an edge delimiting the third housing; and wherein one branch of the flexible lug extends a flank that partly delimits the second housing and in which another branch of the flexible lug extends into the third housing along the first housing.

9. The wiper blade as claimed in claim 8, including two end pieces at respective longitudinal ends of the wiper blade.

10. An end piece for a wiper blade, extending longitudinally between a bottom wall and an inlet for inserting a structural element of the wiper blade into the end piece, said end piece including at least one first housing configured to receive a wiper rubber, a second housing adapted to receive the structural element, and a third housing into which a means for attaching the end piece to the structural element extends, the first housing and the second housing being arranged one above the other in a longitudinal plane of the end piece, characterized in that the attaching means includes a lug which is flexible around a vertical axis (Z') parallel to the longitudinal plane (P), the flexible lug having a generally "L" shape, at least one branch of which extends toward an edge delimiting the third housing; and wherein a larger branch of the flexible lug extends the flank partly delimiting the second housing and in which a smaller branch of the flexible lug is oriented toward the edge delimiting the third housing.

* * * * *